United States Patent
Lin et al.

(10) Patent No.: US 11,177,075 B2
(45) Date of Patent: Nov. 16, 2021

(54) METHOD FOR FORMING POLYMER COMPOSITE MATERIAL ONTO CAPACITOR ELEMENT

(71) Applicant: APAQ TECHNOLOGY CO., LTD., Miaoli County (TW)

(72) Inventors: Chieh Lin, Hsinchu County (TW); Hao-Pu Chang, Taoyuan (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 9 days.

(21) Appl. No.: 16/922,016

(22) Filed: Jul. 7, 2020

(65) Prior Publication Data
US 2021/0012971 A1 Jan. 14, 2021

(30) Foreign Application Priority Data
Jul. 11, 2019 (TW) ................................ 108124423

(51) Int. Cl.
| | | |
|---|---|---|
| H01G 9/00 | (2006.01) | |
| H01G 9/028 | (2006.01) | |
| C08J 3/205 | (2006.01) | |

(52) U.S. Cl.
CPC ............ *H01G 9/0036* (2013.01); *C08J 3/205* (2013.01); *H01G 9/028* (2013.01); *C08J 2341/00* (2013.01)

(58) Field of Classification Search
CPC ....... H01G 9/0036; H01G 9/028; C08J 3/205; C08J 2341/00
See application file for complete search history.

(56) References Cited

U.S. PATENT DOCUMENTS

| | | | | |
|---|---|---|---|---|
| 2016/0012973 A1* | 1/2016 | Takatani | .............. | H01G 9/0036 361/528 |
| 2019/0198254 A1* | 6/2019 | Wang | ....................... | B05D 5/12 |
| 2019/0279826 A1* | 9/2019 | Lin | .......................... | C09D 7/65 |
| 2020/0111622 A1* | 4/2020 | Xiong | .................... | H01G 11/04 |
| 2021/0198469 A1* | 7/2021 | Bunha | ................... | H01M 4/137 |

* cited by examiner

*Primary Examiner* — Dion R. Ferguson
(74) *Attorney, Agent, or Firm* — Li & Cai Intellectual Property (USA) Office

(57) ABSTRACT

A method for forming the polymer composite material onto the capacitor element is provided. The method includes a preparing step, a resting step, an immersing step, and a polymerization step. The preparing step includes forming a homogeneous reaction solution containing 3,4-ethylenedioxythiophene, an emulsifier, polystyrene sulfonic acid or salts thereof, an oxidant, and a solvent. The resting step includes resting the homogeneous reaction solution to generate microparticles so that a nonhomogeneous reaction solution containing the microparticles is formed. The immersing step includes immersing the capacitor element into the nonhomogeneous reaction solution so that the nonhomogeneous reaction solution is coated onto the capacitor element and a reaction layer is formed on the capacitor element. The polymerization step includes heating the reaction layer to form a polymer composite layer containing the polymer composite material, and the polymer composite material is polymerized from 3,4-ethylenedioxythiophene and polystyrene sulfonic acid and salts thereof.

11 Claims, 5 Drawing Sheets

METHOD FOR FORMING POLYMER COMPOSITE MATERIAL ONTO CAPACITOR ELEMENT

CROSS-REFERENCE TO RELATED PATENT APPLICATION

This application claims the benefit of priority to Taiwan Patent Application No. 108124423, filed on Jul. 11, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for forming a polymer composite material, and more particularly to a method for forming a polymer composite material onto a capacitor element.

BACKGROUND OF THE DISCLOSURE

Capacitors are widely used in applications such as consumer appliances, computers, power supplies, communication products, and vehicles, and have become one of the indispensable elements in electronic devices. The main functions of the capacitors include filtering, bypassing, rectifying, coupling, decoupling, and phase inverting, etc. The capacitors can be in different types according to different materials and purposes, including aluminum electrolytic capacitors, tantalum electrolytic capacitors, laminated ceramic capacitors, and thin film capacitors. In conventional technology, with the advantages of small size, large capacitance, and excellent frequency characteristics, solid electrolytic capacitors are used to decouple power circuits of central processing units. In the solid electrolytic capacitors, liquid electrolytic solutions are replaced with solid electrolytes to act as cathodes. On the other hand, with the advantages of high conductivity and being easily manufactured, conductive polymers have been widely applied to the cathodes of the solid electrolytic capacitors.

The conductive polymers, which can be applied to the cathodes of the solid electrolytic capacitors, include polyaniline (PAni), polypyrrole (PPy), polythiophene (PTh), and derivatives thereof, in which poly(3,4-ethylenedioxythiophene):polystyrene sulfonic acid (PEDOT:PSS) composite has excellent conductivity and a lower polymerization rate compared to other polymers such as the PAni and the PPy. Therefore, PEDOT:PSS composite can be polymerized at room temperature and has an easier preparation process. In addition, compared to other polymers, PEDOT:PSS composite has better weather resistance and heat resistance. Furthermore, PEDOT:PSS composite has good dispersibility, low production cost, high transparency and excellent processability. Therefore, using PEDOT:PSS composite as a component of the conductive polymer layer on the cathodes of the capacitors would bring about a great improvement in electrical properties of the capacitors.

However, a method for forming a polymer composite material onto a capacitor element is still needed to simplify a manufacturing process of the capacitor and to improve the overall electrical properties of the capacitor.

SUMMARY OF THE DISCLOSURE

In response to the above-referenced technical inadequacies, the present disclosure provides a method for forming a polymer composite material onto a capacitor element.

In one aspect, the present disclosure provides the method for forming the polymer composite material onto the capacitor element which includes a preparing step, a resting step, an immersing step, and a polymerization step. The preparing step includes forming a homogeneous reaction solution containing 3,4-ethylenedioxythiophene, an emulsifier, polystyrene sulfonic acid or salts thereof, an oxidant, and a solvent. The resting step includes resting the homogeneous reaction solution to generate microparticles so that a nonhomogeneous reaction solution containing the microparticles is formed. The immersing step includes immersing the capacitor element into the nonhomogeneous reaction solution so that the nonhomogeneous reaction solution is coated onto the capacitor element and a reaction layer is formed on the capacitor element. The polymerization step includes heating the reaction layer to form a polymer composite layer containing the polymer composite material. The polymer composite material is polymerized from 3,4-ethylenedioxythiophene and polystyrene sulfonic acid and salts thereof.

In certain embodiments, an average diameter of the microparticles ranges from 300 nm to 500 nm and a standard deviation of diameters of the microparticles ranges from 50 nm to 100 nm.

In certain embodiments, the resting step includes a pretreating step: purifying the nonhomogeneous reaction solution.

In certain embodiments, at least one of an ion-exchange method, a centrifugation method, a dialysis method, a column chromatography method, an ultrafiltration, and a precipitation method is used to purify the nonhomogeneous reaction solution.

In certain embodiments, the pretreating step includes homogenizing the nonhomogeneous reaction solution so that an average diameter of the microparticles ranges from 25 nm to 100 nm and a standard deviation of diameters of the microparticles ranges from 30 nm to 60 nm.

In certain embodiments, the pretreating step includes adding a conductive additive into the purified nonhomogeneous reaction solution.

In certain embodiments, the conductive additive includes at least one of alcohols, polyols, polyglycerols, sugars, and high-boiling solvents.

In certain embodiments, the preparing step includes: adding 3,4-ethylenedioxythiophene and the emulsifier into the solvent to form a homogeneous solution; mixing the homogeneous solution with a polystyrene sulfonic acid solution containing polystyrene sulfonic acid or salts thereof to form a precursor solution; and adding the oxidant into the precursor solution to form the homogeneous reaction solution.

In certain embodiments, the polymerization step includes heating the reaction layer at a temperature of 70° C. to 90° C. to form the polymer composite layer.

In certain embodiments, both of the immersing step and the polymerization step are repeated for at least once after the polymerization step.

In certain embodiments, the polymerization step includes drying the polymer composite layer at a temperature of 180° C. to 220° C. to remove the solvent in the polymer composite layer.

Therefore, the method for forming the polymer composite material onto the capacitor element of the present disclosure has the technical features of "the resting step forms the nonhomogeneous reaction solution containing the microparticles" and "the immersing step immerses the capacitor element into the nonhomogeneous reaction solution" so that electric properties of the capacitor element can be enhanced, and equivalent series resistance (ESR) and leakage current (LC) of the capacitor element can be decreased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
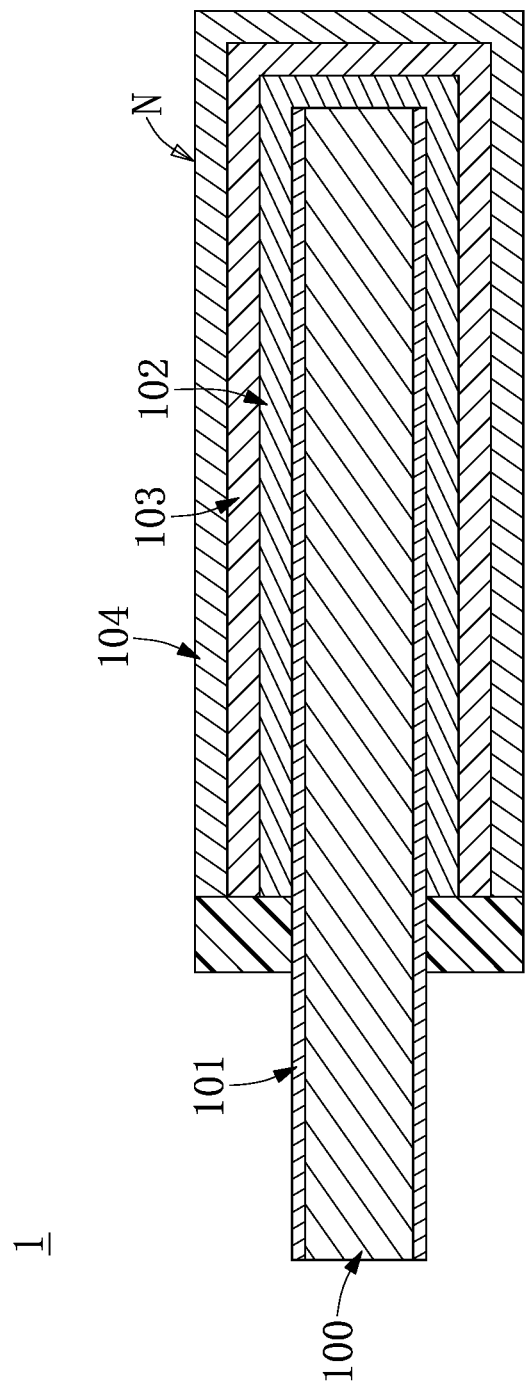
FIG. 1 is a sectional side view of a capacitor using a polymer composite material of an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
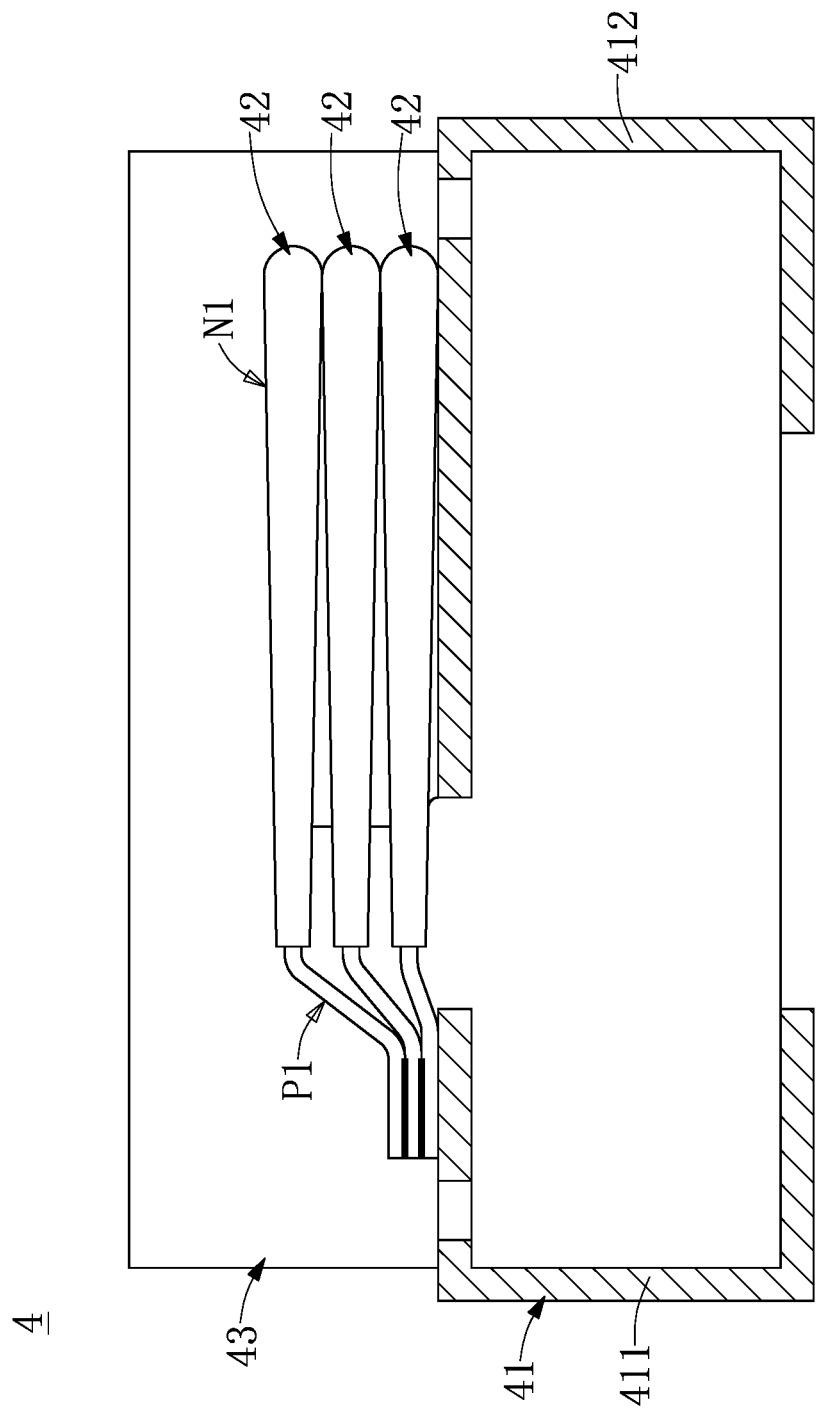
FIG. 2 is a sectional side view of a capacitor package structure of an embodiment of the present disclosure.

Referring to FIG. 1 and FIG. 2, FIG. 1 is a sectional side view of a capacitor using a polymer composite material of an embodiment of the present disclosure. Specifically, the polymer composite material formed by using a method of the present disclosure can be applied to a conductive polymer layer 102 of a cathode portion N of a capacitor 1. FIG. 2 is a sectional side view of a capacitor package structure of an embodiment of the present disclosure. As shown in FIG. 2, the capacitor 1 can be a capacitor unit 42 in a stacked type solid electrolytic capacitor package structure 4.

For example, as shown in FIG. 1, the capacitor 1 may include a metal foil 100, an oxidation layer 101 cladding the metal foil 100, a conductive polymer layer 102 cladding a part of the oxidation layer 101, a carbon paste layer 103 cladding the conductive polymer layer 102, and a silver paste layer 104 cladding the carbon paste layer 103. The structure of the capacitor 1 can be changed or adjusted depending on practical requirements. The conductive polymer layer 102 serves as a solid electrolyte of the capacitor 1.

The conductive polymer layer 102 may be formed by using the method of the present disclosure. Therefore, the capacitor element of the present disclosure may include the metal foil 100 and the oxidation layer 101 thereon as shown in FIG. 1.

As shown in FIG. 2, the stacked type solid electrolytic capacitor 4 includes a plurality of the capacitor units 42 sequentially stacked. In addition, the stacked type solid electrolytic capacitor 4 includes a conductive frame 41. The conductive frame 41 includes a first conductive terminal 411 and a second conductive terminal 412 separated by a predetermined distance from the first conductive terminal 411. Furthermore, the plurality of the capacitor units 42 sequentially stacked and electrically connected to each other respectively have a first positive portion P1 electrically connected to the first conductive terminal 411 of the corresponding conductive frame 41, and a first negative portion N1 electrically connected to the second conductive terminal 412 of the corresponding conductive frame 41. In addition, the plurality of the capacitor units 42 sequentially stacked and electrically connected to each other are clad by a package body 43, thereby forming the stacked type solid electrolytic capacitor 4.

Figure 3:
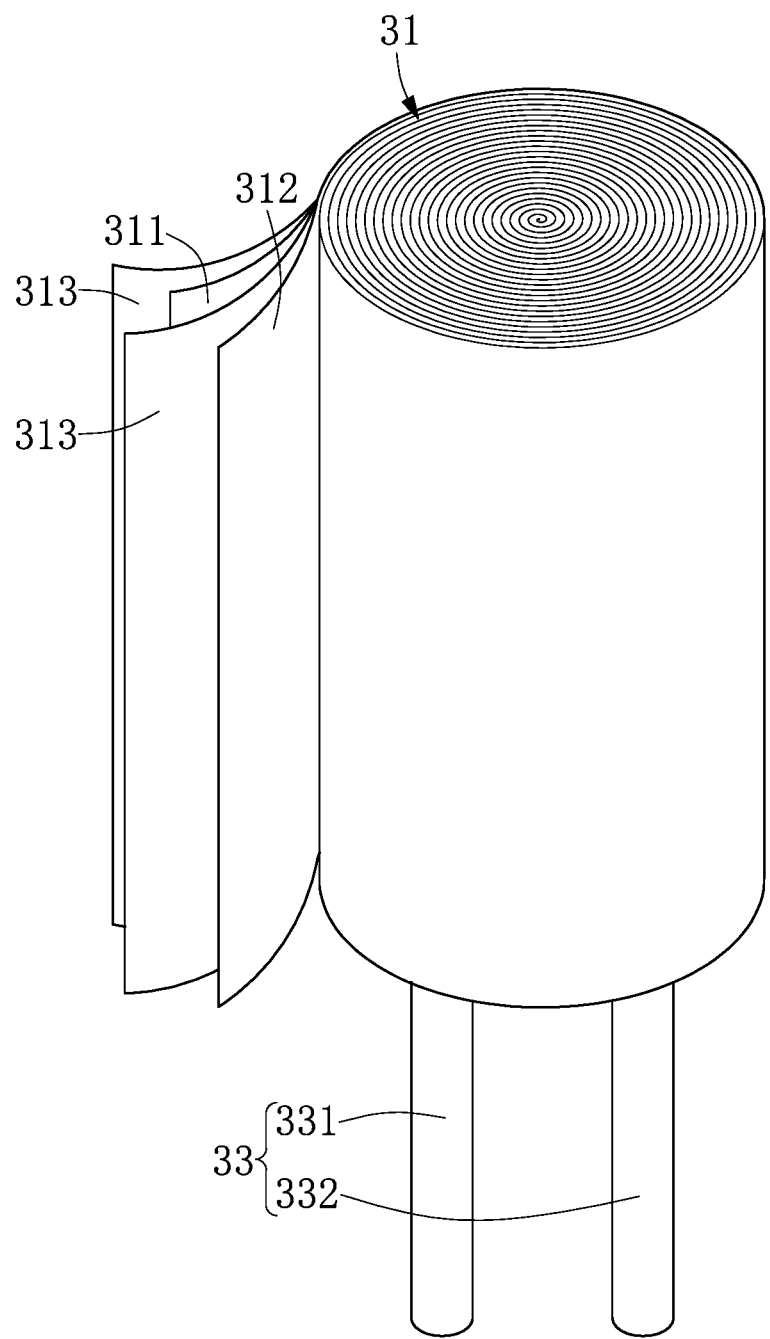
FIG. 3 is a perspective view of another capacitor using the polymer composite material of an embodiment of the present disclosure.
Figure 4:
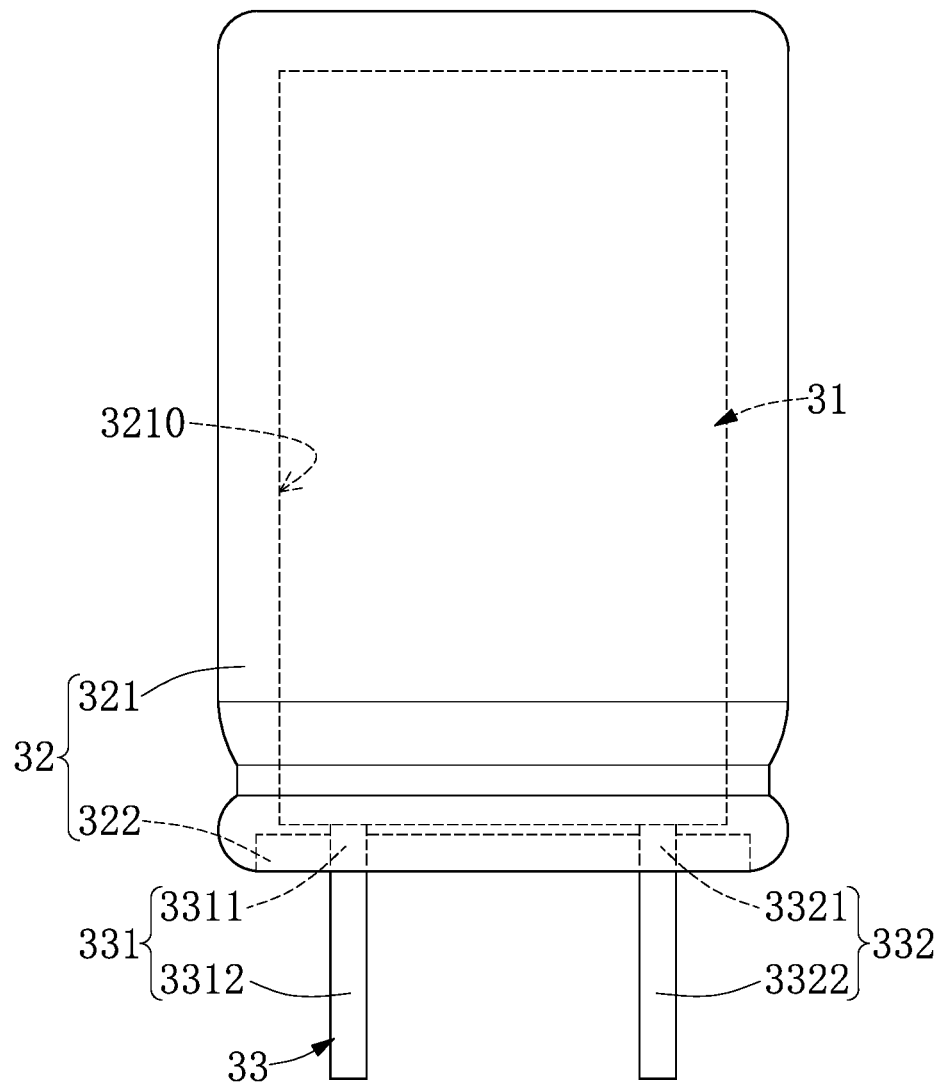
FIG. 4 is a side view of another capacitor package structure of an embodiment of the present disclosure.

Referring to FIG. 3 and FIG. 4, FIG. 3 is a perspective view of another capacitor using the polymer composite material of an embodiment of the present disclosure, and FIG. 4 is a side view of another capacitor package structure of an embodiment of the present disclosure.

As shown in FIG. 4, a winding type solid electrolytic capacitor 3 includes a winding type component 31, a package component 32, and a conductive component 33. Referring to FIG. 3, the winding type component 31 includes a winding type positive conductive foil 311, a winding type negative conductive foil 312, and two winding type isolation foils 313. One of the two winding type isolation foils 313 is disposed between the winding type positive conductive foil 311 and the winding type negative conductive foil 312, and one of the winding type positive conductive foil 311 and the winding type negative conductive foil 312 is disposed between the two winding type isolation foils 313. The winding type isolation foils 313 can be separation papers or paper foils attached with the polymer composite material by the method of the present disclosure. However, the present disclosure is not limited thereto. In another embodiment of the present disclosure, the polymer composite material can be formed onto at least one of the winding type positive conductive foil 311, the winding type negative conductive foil 312, and the two winding type isolation foils 313.

Referring to FIG. 4 again, the winding type component 31 is clad in the package component 32. The package component 32 includes a capacitor casing structure 321, such as aluminum cases or other metal cases, and a bottom sealing structure 322. The capacitor casing structure 321 has an accommodating space 3210 for accommodating the winding type component 31, and the bottom sealing structure 322 is disposed at the bottom of the capacitor casing structure 321 to seal the accommodating space 3210. In addition, the package component 32 may be a package formed by other appropriate insulating materials.

The conductive component 33 includes a first conductive pin 331 electrically contacting the winding type positive conductive foil 311 and a second conductive pin 332 electrically contacting the winding type negative conductive foil 312. The first conductive pin 331 has a first embedded portion 3311 clad in the package component 32 and a first exposed portion 3312 exposed outside the package component 32. The second conductive pin 332 has a second embedded portion 3321 clad in the package component 32 and a second exposed portion bottom sealing structure 3322 exposed outside the package component 32.

Figure 5:
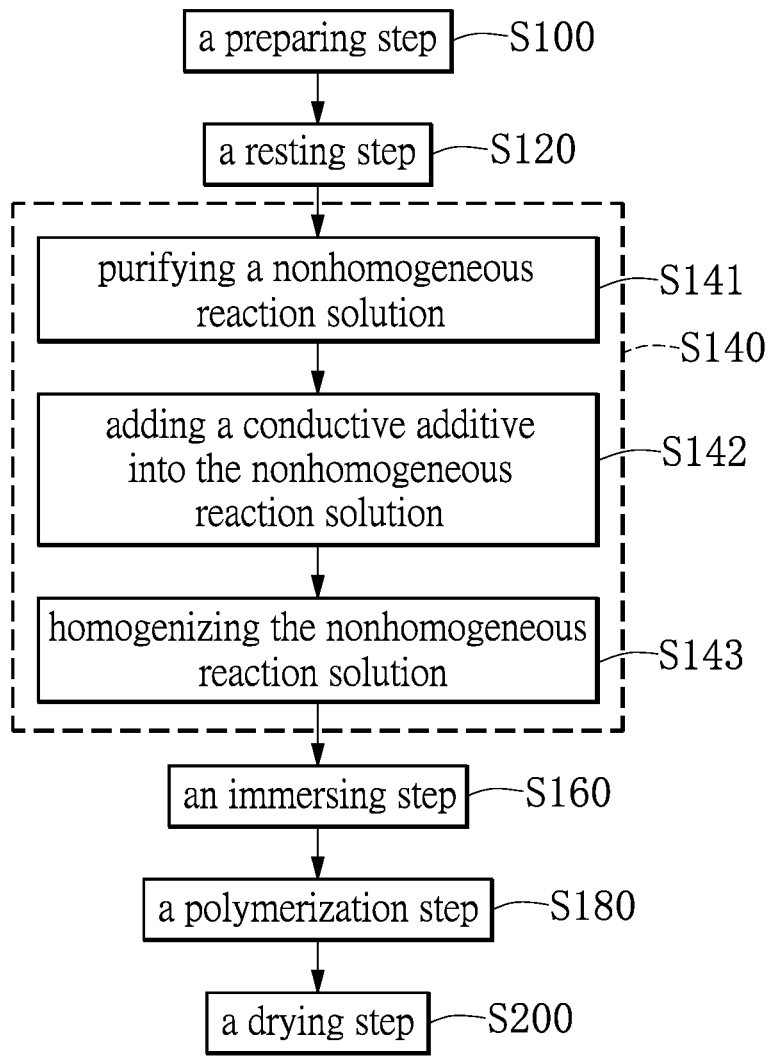
FIG. 5 is a flow chart of a method for forming the polymer composite material onto a capacitor element of an embodiment of the present disclosure.

Subsequently, the method for forming the conductive polymer composite material on the capacitor element is illustrated. Referring to FIG. 5, FIG. 5 is a flow chart of the method for forming the polymer composite material on the capacitor element of the present disclosure. The method includes a preparing step (step S100), a resting step (step S120), a pretreating step (step S140), an immersing step (step S160), a polymerization step (step S180), and a drying step (step S200).

In the preparing step, a homogeneous reaction solution containing 3,4-ethylenedioxythiophene (EDOT), an oxidant, polystyrene sulfonic acid or salts of polystyrene sulfonic acid (PSS) and water (solvent) is formed. The homogeneous reaction solution is a precursor solution for forming the polymer composite material. After chemical reactions occur between components in the homogeneous reaction solution, the polymer composite material is formed. Specifically, with the presence of the oxidant, a polymerization reaction between the 3,4-ethylenedioxythiophene and the polystyrene sulfonic acid or the salts thereof in the homogeneous reaction solution is initiated, and poly(3,4-ethylenedioxythiophene):polystyrene sulfonic acid (PEDOT:PSS) is thereby formed.

In the embodiment, the oxidant can be persulfates, or polystyrene sulfonic acids or salts thereof. Persulfates can be ammonium persulfate, sodium persulfate, potassium persulfate, or a combination thereof. Polystyrene sulfonic acids or salts thereof can be, but not limited to: polystyrene sulfonic acid, polystyrene ammonium sulfonate, sodium polystyrene sulfonate, or a combination thereof. Based on the total weight of the homogeneous reaction solution as 100 wt %, the homogeneous reaction solution contains 0.16 wt % to 0.68 wt % of 3,4-ethylenedioxythiophene, 0.26 wt % to 1.11 wt % of the oxidant, and 0.5 wt % to 2 wt % of polystyrene sulfonic acid or the salts thereof.

Iron salts are generally used as an oxidant in the method for forming polymer composite materials in the related art. However, in the present disclosure, the electrical properties of the capacitor using the polymer composite material may be greatly improved by using the persulfate as the oxidant and the poly(styrenesulfonate) (PSS) as one of the reactants (as a dopant) in the manufacturing process. For example, compared to the related art which adopted the iron salts as the oxidant and p-toluenesulfonic acid as one of the reactants (as a dopant), the present disclosure can reduce leakage current (LC) of a capacitor (e.g., a 25 V capacitor) by using the persulfate as the initiator and using the PSS as the dopant.

In an embodiment of the present disclosure, an additive, such as an emulsifier, can be added in the homogeneous reaction solution. The emulsifier can be a non-ionic surfactants, a cationic surfactants, or an anionic surfactants. For example, the non-ionic surfactants can be Triton™, Tween®, Zonyl® FSO, Dynal™, Nonidet™, polyoxyethylene sorbitan alkylate, castor oil ethoxylate, propylene glycol esters of fatty acid, polyoxyethylene glycerin fatty acid ester, sorbitan fatty acid ester, polyoxyethylene phytosterol, or any combination thereof. The cationic surfactants can be cetyltrimethylammonium bromide, dodecyltrimethylammonium chloride, octadecyltrimethylammonium chloride, alkyl dimethyl benzyl ammonium chloride, or any combination thereof. The anionic surfactants can be sodium dodecyl sulfate, glycolic acid ethoxylate lauryl ether, glycolic acid ethoxylate-4-nonylphenyl ether, potassium monolauryl phosphate, disodium laureth sulfosuccinate, sodium dodecyl polyoxyether sulfate, sodium dodecylbenzene sulfonate, or any combination thereof.

In the embodiment, the solvent can also be alcohol. It should be noted that, applying water as the solvent can reduce cost, be environment-friendly, and prevent short circuit of the solid capacitor caused by high voltage. Moreover, compared to conventional PETOD:PSS dispersion, a mixed solution based on water as solvent avoids problems of expiration.

The preparing step (step S100) includes the following steps: dissolving the 3,4-ethylenedioxythiophene and the emulsifier into water to form a homogenous solution; mixing a PSS solution including the PSS or salts thereof with the homogeneous solution to form a precursor solution; and adding the oxidant into the precursor solution to form the homogeneous reaction solution. In addition, a step of stirring at room temperature for 1.5 to 2.5 hours is further included in the step of dissolving the 3,4-ethylenedioxythiophene and the emulsifier into the water.

The resting step (step S120) includes the following steps: resting the homogeneous reaction solution to form microparticles so that a nonhomogeneous reaction solution is formed microscopically. Specifically, the homogeneous reaction solution is rested still for 2 to 24 hours at a temperature of 10° C. to 30° C. to form the nonhomogeneous reaction solution. In addition, an average diameter of microparticles in the nonhomogeneous reaction solution ranges from 300 nm to 500 nm, and a standard deviation of diameters of microparticles in the nonhomogeneous reaction solution ranges from 50 nm to 100 nm.

In the resting step (step S120), 3,4-ethylenedioxythiophene tends to prepolymerize or reunite to form poly(3,4-ethylenedioxythiophene) and then polystyrene sulfonic acid or salts thereof tends to attach onto poly(3,4-ethylenedioxythiophene). In microscopic view, a structure of microparticles is composed of poly(3,4-ethylenedioxythiophene) as a core and polystyrene sulfonic acid attached onto and surrounding poly(3,4-ethylenedioxythiophene).

In addition, hydrophobic force between the nonhomogeneous reaction solution and the capacitor element can be weakened by microparticles in the nonhomogeneous reaction solution. In other words, an impregnation effect of the capacitor element immersing in the nonhomogeneous reaction solution can be enhanced due to microparticles in the nonhomogeneous reaction solution. Therefore, a capacity of the capacitor can be enhanced, an equivalent series resistance of the capacitor can be reduced, and a risk of current leakage and short circuit can be decreased.

The pretreating step (step S140) includes the following steps: purifying the nonhomogeneous reaction solution (step S141), adding conductive additives in the nonhomogeneous reaction solution (step S142), and then homogenizing the nonhomogeneous reaction solution (step S143).

In the step S141, the nonhomogeneous reaction solution can be purified by at least one of an ion exchange method, a centrifugal method, a dialysis method, a column chromatography, an ultrafiltration, and a sedimentation method. In the embodiment, the nonhomogeneous reaction solution is purified by an ion exchange method. Specifically, 1 kg of the nonhomogeneous reaction solution is mixed with 60 g to 100 g of a strongly acidic ion exchange resin and stirred at room temperature for 6 hours to exchange cations in the nonhomogeneous reaction solution. Subsequently, 1 kg of the nonhomogeneous reaction solution is mixed with 70 g to 120 g of a weakly basic ion exchange resin and stirred for 6 hours to exchange medium or strongly acidic anions, such as $SO_4^{2-}$, $Cl^-$, or $NO_3^-$, in the nonhomogeneous reaction solution.

In the step S142, the conductive additives includes: polyols, polyalcohols, polyglycerols, sugars, high-boiling solvents, or alcohol solvents. Polyols can be but not limited to: ethylene glycol, glycerol, or diethylene glycol. Polyalcohols can be but not limited to: polypropylene glycol, or polyethylene glycol with molecular weights of 200, 300, 400, 600, 1000, 1500, or 2000. Sugars can be but not limited to: sorbitol, xylitol, maltitol, meso-erythritol, glucose, lactose, or fructose. High-boiling solvents can be but not limited to: dimethyl sulfoxide (DMSO), dimethylformamide (DMF), gamma-butyrolactone (γ-GBL), N-methylpyrrolidone (NMP), dimethylacetamide (DMAc), sulfolane, caprolactam, 1-octyl-2-pyrrolidone, propylene carbonate, ethylene carbonate, diethyl carbonate, or acetonitrile. Different kinds of conductive additives can be mixed.

In the step S143, the nonhomogeneous reaction solution can be homogenized by a homogenous mixer, an ultrasonic grinder, or a high-pressure homogenizer. In the embodiment, the nonhomogeneous reaction solution is homogenized by a high-pressure homogenizer at a pressure of 1500 bar for five times. After the homogenous process, an average diameter of microparticles in the nonhomogeneous reaction solution ranges from 25 nm to 100 nm and a standard deviation of diameters of the microparticles in the nonhomogeneous reaction solution ranges from 30 nm to 60 nm.

It should be noted that, the sequence between the step S142 and the step S143 is not limited thereto. That is, after the purifying process (step S141), the conductive additive can be added into the nonhomogeneous reaction solution (step S142) before the nonhomogeneous reaction solution is homogenized (step S143), or the nonhomogeneous reaction solution can be homogenized (step S143) before the conductive additive is added into the nonhomogeneous reaction solution (step S142).

The immersing step (step S160) includes the step of immersing the capacitor element in the nonhomogeneous reaction solution for 3 to 5 minutes and immersing the capacitor element in the nonhomogeneous reaction solution again under a vacuum condition of 0 mmHg to 200 mmHg. Accordingly, the nonhomogeneous reaction solution is coated on the capacitor element so that a reaction layer is formed on the capacitor element. Specifically, reactants (3,4-ethylenedioxythiophene and polystyrene sulfonic acid or salts thereof in the nonhomogeneous reaction solution) and microparticles are disposed on the capacitor element before being reacted with each other. The nonhomogeneous reaction solution is coated on a surface of the capacitor element and permeated in the porous structure of the capacitor element (such as holes).

Specifically, the capacitor element can be immersed into a container accommodating the nonhomogeneous reaction solution so that the nonhomogeneous reaction solution can be attached onto the capacitor element. Ultrasound or vibration can be applied during the immersing step so as to promote the nonhomogeneous reaction solution coated on the capacitor element or promote the nonhomogeneous reaction solution permeating in the holes of the capacitor element, thereby assisting the formation of the reaction layer.

In the polymerization step (step S180), the reaction layer is baked under 70° C. to 90° C. for 30 minutes so that the reactants (3,4-ethylenedioxythiophene and polystyrene sulfonic acid or salts thereof in the nonhomogeneous reaction solution) are polymerized and formed the polymer composite material along with the microparticles. In other words, the reaction layer is turned into the polymer composite material layer, and the polymer composite material layer includes the polymer composite material. In the present disclosure, the polymer composite material is formed by in-situ polymerization.

In the polymerization step, 3,4-ethylenedioxythiophene and polystyrene sulfonic acid or salts thereof are reacted to form the PEDOT:PSS composite with a presence of the oxidant. In the present disclosure, the polymer composite material is the PEDOT:PSS composite.

In addition, the polymer composite layer of the capacitor element is not limited to only one layer. By repeating the immersing step (step 160) and polymerization step (step 180), the capacitor element can have multiple polymer composite layers so as to meet expected thickness or properties.

In the drying step (step S200), the polymer composite layer is baked at a temperature of 180° C. to 220° C. for 30 minutes so as to remove the solvent in the polymer composite layer. In a preferable embodiment, the polymer composite layer is baked at 200° C.

Examples and testing results of the examples are illustrated below to prove the effects of the method for forming the polymer composite material on the capacitor element of the present disclosure. Examples 1 to 3 illustrate the preparation of the nonhomogeneous reaction solution. Examples 4a to 4c and Examples 5a to 5c illustrate the formation of the polymer composite layer on the capacitor element.

Example 1

0.68 g of 3,4-ethylenedioxythiophene, 2 g of polystyrene sulfonic acid, 0.78 g of ammonium persulfate, and 10 g of cetyltrimethylammonium bromide are added into 996.54 g of water to prepare the homogeneous reaction solution (step S100). The homogeneous reaction solution is rested at room temperature for 14 hours to form the nonhomogeneous reaction solution (step S120). 70 g of strongly acidic cation-exchange resin and 130 g of weakly basic anion-exchange resin are added in the nonhomogeneous reaction solution, and then the nonhomogeneous reaction solution is stirred and mixed continuously for 6 hours. After 6 hours of stirring and mixing, the ion-exchange resins are separated from the nonhomogeneous reaction solution by filtration (step S141). After filtration, 60 g of polyethylene glycol 300 (PEG 300) and 60 g of ethylene glycol acting as conductive additives are added into the nonhomogeneous reaction solution and the conductive additives are uniformly mixed with the nonhomogeneous reaction solution (step S142). The nonhomogeneous reaction solution is homogenized at a pressure of 1500 bar for five times (step S143).

Example 2

0.68 g of 3,4-ethylenedioxythiophene, 2 g of polystyrene sulfonic acid, 0.78 g of ammonium persulfate, and 10 g of Dynal 604 are added into 996.54 g of water to prepare the homogeneous reaction solution (step S100). The homogeneous reaction solution is rested at room temperature for 14 hours to form the nonhomogeneous reaction solution (step S120). 70 g of strongly acidic cation-exchange resin and 130 g of weakly basic anion-exchange resin are added in the nonhomogeneous reaction solution, and then the nonhomogeneous reaction solution is stirred and mixed continuously for 6 hours. After 6 hours of stirring and mixing, the ion-exchange resins are separated from the nonhomogeneous reaction solution by filtration (step S141). After filtration, 100 g of dimethyl sulfoxide and 50 g of sorbitol acting as conductive additives are added into the nonhomogeneous reaction solution and the conductive additives are uniformly mixed with the nonhomogeneous reaction solution (step S142). The nonhomogeneous reaction solution is homogenized at a pressure of 1500 bar for five times (step S143).

Example 3

0.68 g of 3,4-ethylenedioxythiophene, 11.1 g of 18 wt % polystyrene sulfonic acid solution, 0.78 g of ammonium persulfate, and 10 g of sodium dodecyl benzene sulfonate are added into 987.44 g of water to prepare the homogeneous reaction solution (step S100). The homogeneous reaction solution is rested at room temperature for 14 hours to form the nonhomogeneous reaction solution (step S120). 70 g of strongly acidic cation-exchange resin and 130 g of weakly basic anion-exchange resin are added in the nonhomogeneous reaction solution, and then the nonhomogeneous reaction solution is stirred and mixed continuously for 6 hours. After 6 hours of stirring and mixing, the ion-exchange resins are separated from the nonhomogeneous reaction solution by filtration (step S141). After filtration, 100 g of dimethyl sulfoxide, 30 g of polyethylene glycol, and 20 g of maltitol acting as conductive additives are added into the nonhomogeneous reaction solution and the conductive additives are uniformly mixed with the nonhomogeneous reaction solution (step S142). The nonhomogeneous reaction solution is homogenized at a pressure of 1500 bar for five times (step S143).

Examples 4a to 4c

The capacitor element is immersed in the nonhomogeneous reaction solution of Examples 1 to 3 for 3 minutes (step S160). After immersing, the nonhomogeneous reaction solution on the capacitor element is polymerized at a temperature of 80° C. for 30 minutes (step S180) and then is baked at a temperature of 200° C. for 30 minutes (step S200). Electric properties of the capacitor element are measured after cooling to room temperature and listed in Table 1.

Examples 5a to 5c

The capacitor element is immersed in the nonhomogeneous reaction solution of Examples 1 to 3 for 3 minutes (step S160). After immersing, the nonhomogeneous reaction solution on the capacitor element is polymerized at a temperature of 80° C. for 30 minutes (step S180). It should be noted that, the mentioned immersing step (step S160) and the mentioned polymerization step (step S180) are repeated twice and then is baked at a temperature of 200° C. for 30 minutes (step S200). Electric properties of the capacitor element are measured after cooling to room temperature and listed in Table 1.

TABLE 1 electric properties of the capacitor element of Examples 4a to 4c and Examples 5a to 5c

| | Capacity (μF) | Equivalent series resistance (mΩ) |
| --- | --- | --- |
| Example 4a | 380 | 32 |
| Example 4b | 400 | 38 |
| Example 4c | 385 | 26 |
| Example 5a | 586 | 9.3 |
| Example 5b | 580 | 8.4 |
| Example 5c | 584 | 5.6 |

In conclusion, the method for forming the polymer composite material onto the capacitor element of the present disclosure has the technical features of "the resting step forms the nonhomogeneous reaction solution containing microparticles" and "the immersing step immerses the capacitor element into the nonhomogeneous reaction solution" so that electric properties of the capacitor element can be enhanced, and ESR and leakage current of the capacitor element can be decreased.

Further, the technical features of "controlling the average diameter of microparticles" and "controlling the standard deviation of diameters of microparticles" can enhance the crystallinity of the polymer composite material so that the electric properties of the capacitor element is enhanced.

Further, the technical feature of "purifying the nonhomogeneous reaction solution" can decrease impurities contained in the polymer composite material so as to enhance the quality of the polymer composite material.

Further, the technical feature of "homogenizing the nonhomogeneous reaction solution" can assist in the formation of a uniform conductive polymer layer with a high quality.

Further, the technical feature of "repeating the immersing step and the polymerization step at least once" can increase the capacity of the capacitor element and decrease ESR of the capacitor element.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for forming a polymer composite material onto a capacitor element, comprising:
    a preparing step: forming a homogeneous reaction solution containing 3,4-ethylenedioxythiophene, an emulsifier, polystyrene sulfonic acid or salts thereof, an oxidant, and a solvent;
    a resting step: resting the homogeneous reaction solution to generate microparticles so that a nonhomogeneous reaction solution containing the microparticles is formed;
    an immersing step: immersing the capacitor element into the nonhomogeneous reaction solution so that the nonhomogeneous reaction solution is coated onto the capacitor element and a reaction layer is formed on the capacitor element; and
    a polymerization step: heating the reaction layer to form a polymer composite layer containing the polymer composite material; wherein the polymer composite material is polymerized from 3,4-ethylenedioxythiophene and polystyrene sulfonic acid and salts thereof.

2. The method according to claim 1, wherein an average diameter of the microparticles ranges from 300 nm to 500 nm and a standard deviation of diameters of the microparticles ranges from 50 nm to 100 nm.

3. The method according to claim 1, wherein the resting step includes a pretreating step: purifying the nonhomogeneous reaction solution.

4. The method according to claim 3, wherein at least one of an ion-exchange method, a centrifugation method, a dialysis method, a column chromatography method, an ultrafiltration, and a precipitation method is used to purify the nonhomogeneous reaction solution.

5. The method according to claim 3, wherein the pretreating step includes homogenizing the nonhomogeneous reaction solution so that an average diameter of the microparticles ranges from 25 nm to 100 nm and a standard deviation of diameters of the microparticles ranges from 30 nm to 60 nm.

6. The method according to claim 3, wherein the pretreating step includes adding a conductive additive into the purified nonhomogeneous reaction solution.

7. The method according to claim 6, wherein the conductive additive includes at least one of alcohols, polyols, polyglycerols, sugars, and high-boiling solvents.

8. The method according to claim 1, wherein the preparing step includes: adding 3,4-ethylenedioxythiophene and the emulsifier into the solvent to form a homogeneous solution; mixing the homogeneous solution with a polystyrene sulfonic acid solution containing polystyrene sulfonic acid or salts thereof to form a precursor solution; and adding the oxidant into the precursor solution to form the homogeneous reaction solution.

9. The method according to claim 1, wherein the polymerization step includes heating the reaction layer at a temperature of 70° C. to 90° C. to form the polymer composite layer.

10. The method according to claim 1, wherein the immersing step and the polymerization step are both repeated for at least once after the polymerization step.

11. The method according to claim 1, wherein the polymerization step includes drying the polymer composite layer at a temperature of 180° C. to 220° C. to remove the solvent in the polymer composite layer.

* * * * *